United States Patent [19] [11] 4,376,101
Sartori et al. [45] Mar. 8, 1983

[54] PROCESS FOR REMOVING ACID GASES USING A BASIC SALT ACTIVATED WITH A NON-STERICALLY HINDERED DIAMINE

[75] Inventors: Guido Sartori, Linden; Chang J. Kim, Somerset; Michael T. Melchior, Scotch Plains; David W. Savage, Summit, all of N.J.

[73] Assignee: Exxon Research and Engineering Co., Florham Park, N.J.

[21] Appl. No.: 321,059

[22] Filed: Nov. 13, 1981

[51] Int. Cl.³ .................. B01D 53/34; C09K 3/00
[52] U.S. Cl. .................. 423/223; 423/226; 423/228; 423/232; 423/234; 252/189; 252/190; 252/192
[58] Field of Search .......... 423/223, 226, 228, 229, 423/232, 234; 252/189, 190, 192

[56] References Cited

U.S. PATENT DOCUMENTS

| Re. 18,958 | 9/1933 | Bottoms | 423/228 |
| 1,783,901 | 12/1930 | Bottoms | 423/228 |
| 1,845,403 | 2/1932 | Eisleb | 546/150 |
| 2,161,663 | 6/1939 | Baehr et al. | 423/228 |
| 2,490,840 | 12/1949 | Shaw | 423/228 |
| 2,826,578 | 3/1958 | Perron | 544/168 |
| 2,946,652 | 7/1960 | Bloch | 423/226 |
| 3,431,267 | 3/1969 | Welcher | 546/246 |
| 3,502,428 | 3/1970 | Gelbein et al. | 423/226 |
| 3,516,793 | 6/1970 | Renault | 423/225 |
| 3,716,620 | 2/1973 | Deschamps et al. | 423/228 |
| 3,879,399 | 4/1975 | Zondler et al. | 546/246 |
| 4,094,957 | 6/1978 | Sartori et al. | 423/223 |
| 4,112,050 | 9/1978 | Sartori et al. | 423/223 |

FOREIGN PATENT DOCUMENTS 1104953 11/1955 France .
1352161 1/1964 France .

Primary Examiner—Earl C. Thomas
Attorney, Agent, or Firm—Janet E. Hasak

[57] ABSTRACT

Acidic gases containing carbon dioxide are removed from a normally gaseous mixture by absorbing $CO_2$ from the gaseous mixture with an aqueous solution comprising a basic alkali metal salt or hydroxide and an activator or promoter system for the salt or hydroxide which contains (i) at least one non-sterically hindered diamine defined as having both a primary and a tertiary amino moiety wherein the primary amino moiety is attached to a primary carbon atom, and (ii) an amino acid, and desorbing at least partially the absorbed $CO_2$ from the aqueous solution.

15 Claims, No Drawings

PROCESS FOR REMOVING ACID GASES USING A BASIC SALT ACTIVATED WITH A NON-STERICALLY HINDERED DIAMINE

BACKGROUND OF THE INVENTION

1. Field of the Invention

This invention relates to use of a specific class of diamine compounds in admixture with an amino acid as cosolvent therefor in an aqueous absorbing solution for "hot pot" type acid gas scrubbing processes.

2. Description of Related Patents

Recently, it was shown in U.S. Pat. No. 4,112,050 that sterically hindered amines are superior to diethanolamine (DEA) as promoters for alkaline salts in the "hot pot" acid gas scrubbing process. U.S. Pat. No. 4,094,957 describes an improvement to this process whereby amino acids, particularly sterically hindered amino acids, serve to prevent phase separation of the aqueous solution containing sterically hindered amines at high temperatures and low fractional conversions during the acid gas scrubbing process.

While combinations of sterically hindered diamines such as N-cyclohexyl propanediamine (CHPD) with a cosolvent such as pipecolinic acid represent preferred activator systems in U.S. Pat. No. 4,094,957 for promoting hot carbonate $CO_2$ scrubbing operations, there are certain disadvantages associated therewith. One difficulty is that sterically hindered primary-secondary diamines such as CHPD are unstable in the presence of $CO_2$ and tend to enter into undesirable intramolecular condensation reactions therewith to form a cyclic urea precipitate, which reactions are catalyzed by any $H_2S$ present in the gaseous system. The side reaction of CHPD with $CO_2$ can be represented as follows:

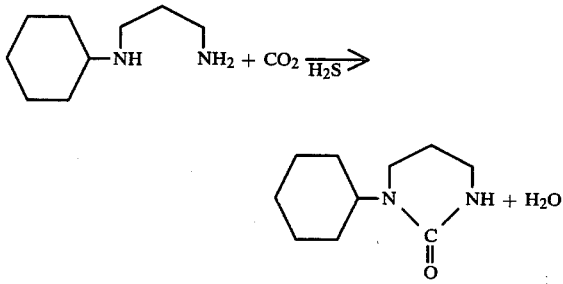

Not only is the diamine consumed by this reaction, but the insoluble cyclic urea must be removed from the system to avoid congestion of the plant operation.

SUMMARY OF THE INVENTION

It has been discovered that a certain family of non-sterically hindered diamino compounds containing both a primary and a tertiary amino group wherein the primary amino group is attached to a primary carbon atom are stable in the presence of the gaseous mixture and, together with an amino acid cosolvent, form an amino activator system which performs effectively in hot carbonate scrubbing operations.

In one embodiment of the present invention there is provided a process for the removal of $CO_2$ from a gaseous stream containing $CO_2$ which comprises (1) in an absorption step, absorbing $CO_2$ from said gaseous stream with an aqueous absorbing solution comprising (a) a basic alkali metal salt or hydroxide selected from the group consisting of alkali metal bicarbonates, carbonates, hydroxides, borates, phosphates, and their mixtures, and (b) an activator or promoter system for said basic alkali metal salt or hydroxide comprising (i) at least one non-sterically hindered diamine which is defined as a compound containing both a primary and a tertiary amino moiety wherein the primary amino moiety is attached to a primary carbon atom and (ii) an amino acid which has the capability to increase the solubility of said diamines in alkaline aqueous conditions at elevated temperatures, and (2) in a desorption and regeneration step, desorbing at least a portion of the absorbed $CO_2$ from said absorbing solution.

As another embodiment of the invention there is provided an aqueous acid gas scrubbing composition comprising: (a) 10 to about 40% by weight of an alkali metal salt or hydroxide, (b) 2 to about 20% by weight of a diamine of the formula given above, (c) 2 to about 20% by weight of an amino acid which has the capability to increase the solubility of the diamine in alkaline aqueous conditions at elevated temperatures and (d) the balance, water.

The mole ratio of diamine to amino acid may vary widely but is preferably 1:3 to 3:1, most preferably 1:1. The amino acid may be added to the scrubbing solution containing the diamine all at once or in increments during the gas scrubbing operation.

The non-sterically hindered diamino compound herein may be any compound which is water soluble in the presence of the amino acid co-promoter and has both a primary and tertiary amino moiety, provided that the primary amino moiety is attached to a primary carbon atom. A preferred diamine of the invention is a compound represented by the following general formulae:

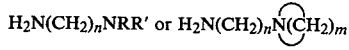

wheren R and R' independently represent a $C_1$–$C_6$ alkyl or a $C_6$–$C_8$ cycloalkyl group, n is an integer of at least 2, and m is an integer of at least 4. Typical such diamines include N,N-diethyl-1,3-propanediamine, N-methyl-N-butyl-1,3-propanediamine, N,N-dibutyl-1,3-propanediamine, N-methyl-N-cyclohexyl-1,3-propanediamine, N-methyl-N-cyclohexyl ethylenediamine, N-3-aminopropyl-2-pipecoline, N-(2-aminoethyl)-hexamethyleneimine, N-(3-aminopropyl)-hexamethyleneimine, and the like. Preferably, the diamine will have a cyclic tertiary amino moiety, and most preferably will be N-3-aminopropyl-2-pipecoline.

The amino acids herein include any amino acids which are soluble in the alkaline aqueous solution to be used in the acid gas treating solution. Preferably, the amino acid will have 4 to 8 carbon atoms and one amino moiety and will be free of any hydroxyl groups. Especially preferred within this category are tertiary amino acids, defined as amino acids wherein the amino moiety is a tertiary amino moiety such as N,N-dimethyl glycine and N,N-diethyl glycine. Also especially preferred are sterically hindered amino acids of 4 to 8 carbon atoms defined as those containing at least one secondary amino moiety attached to either a secondary or tertiary carbon atom or a primary amino moiety attached to a tertiary carbon atom. At least one of the nitrogen atoms will have a sterically hindered structure. Typical sterically hindered amino acids useful in the practice of the present invention will include N-secondary butyl glycine, pipecolinic acid, N-isopropyl glycine, N-2-amyl glycine, N-isopropyl alanine, N-secondary butyl alanine, 2-amino-2-methyl butyric acid, and 2-amino-2-methyl valeric acid.

In general, the aqueous scrubbing solution will comprise an alkaline material comprising a basic alkali metal salt or alkali metal hydroxide selected from Group IA of the Periodic Table of Elements. More preferably, the alkali metal salt or hydroxide in the scrubbing solution is potassium or sodium borate, carbonate, hydroxide, phosphate, or bicarbonate or mixtures thereof. Most preferably, the alkaline material is potassium carbonate.

The alkaline material comprising the basic alkali metal salt or alkali metal hydroxide may be present in the scrubbing solution in the range from about 10% to about 40% by weight, preferably from 20% to about 35% by weight. The actual amount of alkaline material chosen will be such that the alkaline material and the activator or promoter system remain in solution throughout the entire cycle of absorption of $CO_2$ from the gas stream and desorption of $CO_2$ from the solution in the regeneration step. Likewise, the amount and mole ratio of the amino acid to the diamine is maintained such that they remain in solution as a single phase throughout the absorption and regeneration steps. Typically, these criteria are met by including from about 2 to about 20% by weight of the amino acid, preferably from 5 to 15% by weight, more preferably, 5 to 10% by weight of the amino acid and from 2 to about 20% by weight, preferably, 5 to about 15% by weight of the non-sterically hindered diamino compound.

The aqueous scrubbing solution may include a variety of additives typically used in acid gas scrubbing processes, e.g., antifoaming agents, antioxidants, corrosion inhibitors and the like. The amount of these additives will typically be in the range that they are effective, i.e., an effective amount.

DESCRIPTION OF THE PREFERRED EMBODIMENTS

The term acid gas includes $CO_2$ alone or in combination with $H_2S$, $CS_2$, HCN, COS and the oxides and sulfur derivatives of $C_1$ to $C_4$ hydrocarbons. These acid gases may be present in trace amounts within a gaseous mixture or in major proportions.

In the absorption step, the contacting of the absorbent mixture and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2,000 psia, preferably 100 to 1,500 psia, and most preferably, 200 to 1,000 psia in the absorber. In the desorber, the pressures will range from about 5 to 100 psig. The partial pressure of the acid gas, e.g., $CO_2$, in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption, the solution is maintained in a single phase. The amino acid aids in reducing foam in the contacting vessels.

The aqueous absorption solution comprising the alkaline material and the activator system of diamine and amino acid which is saturated or partially saturated with gases, such as $CO_2$ and $H_2S$, may be regenerated so that it may be recycled back to the absorber. The regeneration should also take place in a single liquid phase. Therefore, the presence of the amino acid cosolvent provides an advantage in this part of the overall acid gas scrubbing process. The regeneration or desorption is accomplished by conventional means, such as pressure reduction, which causes the acid gases to flash off by passing the solution into a tower of similar construction to that used in the absorption step, at or near the top of the tower, and passing an inert gas such as air or nitrogen or preferably steam up the tower. The temperature of the solution during the regeneration step may be the same as used in the absorption step, i.e., 25° to about 200° C., and preferably 35° to about 150° C. The absorbing solution, after being cleansed of at least a portion of the acid bodies, may be recycled back to the absorbing tower. Makeup absorbent may be added as needed. Single phase is maintained during desorption by controlling the acid gas, e.g., $CO_2$, level so that it does not fall into the region where two liquid phases form. This, of course, following the practice of the present invention, is facilitated by the use of a highly water soluble amino acid in the mixture.

As a typical example, during desorption, the acid gas (e.g., $CO_2$)-rich solution from the high pressure adsorber is sent first to a flash chamber where steam and some $CO_2$ are flashed from solution at low pressure. The amount of $CO_2$ flashed off will, in general, be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure; thus at about 16 to 25 psia stripper pressures, the temperature will preferably be about 100° to about 140° C. during desorption. Single phase is maintained during desorption by regulating the amount of acid gas, e.g., $CO_2$, recovered.

In the most preferred embodiment of the present invention, the acid gas, e.g., $CO_2$, is removed from a gaseous stream by means of a process which comprises, in sequential steps, (1) contacting the gaseous stream with a solution comprising 10 to about 40 weight percent, preferably 20 to about 30 weight percent, of potassium carbonate, an activator or promoter system comprising 2 to about 20 weight percent, preferably 5 to about 15 weight percent, of the diamine as herein defined, and 2 to about 20 weight percent, preferably 5 to about 15 weight percent, more preferably 5 to about 10 weight percent, of the amino acid as herein defined, the balance of said solution being comprised of water, said contacting being conducted at conditions whereby the acid gas is absorbed in said solution, and preferably at a temperature ranging from 25° to about 200° C., more preferably from 35° to about 150° C., and a pressure ranging from 100 to about 1500 psia, and (2) regenerating said solution at conditions whereby said acid gas is desorbed from said solution. By practicing the present invention, one can operate the process above described at conditions whereby the working capacity, which is the difference in moles of acid gas absorbed in the solution at the termination of steps (1) and (2) based on the moles of potassium carbonate originally present, is comparable to that obtained under the same operating conditions for removing acid gases from gaseous streams, wherein sterically hindered diamines are employed with an amino acid cosolvent. In other words, working capacity is defined as follows:

$$\begin{array}{c}CO_2 \text{ in solution} \\ \text{at completion of} \\ \text{absorption}\end{array} \text{ less } \begin{array}{c}CO_2 \text{ in solution} \\ \text{at completion of} \\ \text{desorption}\end{array}$$

Which is:

$$\frac{\text{Moles of } CO_2 \text{ Absorbed}}{\text{Initial Moles } K_2CO_3} \text{ less } \frac{\text{Moles Residual } CO_2 \text{ Absorbed}}{\text{Initial Moles } K_2CO_3}$$

It should be noted that throughout the specification wherein working capacity is referred to, the term may be defined as the difference between $CO_2$ loading in solution at absorption conditions (step 1) and the $CO_2$ loading in solution at regeneration conditions (step 2) each divided by the initial moles of potassium carbonate. The working capacity is equivalent to the thermodynamic cyclic capacity; that is, the loading is measured at equilibrium conditions. This working capacity may be obtained from the vapor-liquid equilibrium isotherm, that is, from the relation between the $CO_2$ pressure in the gas and the acid gas, e.g., $CO_2$ loading in the solution at equilibrium at a given temperature. To calculate thermodynamc cyclic capacity, the following parameters must usually be specified: (1) acid gas, e.g., $CO_2$, absorption pressure, (2) acid gas, e.g., $CO_2$, regeneration pressure, (3) temperature of absorption, (4) temperature of regeneration, (5) solution composition, that is, weight percent amino acid, weight percent diamine and weight percent of the alkaline salt or hydroxide, for example, potassium carbonate, and (6) gas composition.

Besides providing working capacities and rates of absorption and desorption which are comparable to those of the sterically hindered diamines, the specific class of diamines herein are economical and have increased stability in the presence of $CO_2$ gas.

Steam requirements are the major part of the energy cost of operating an acid gas, e.g., $CO_2$, scrubbing unit. Substantial reduction in energy, i.e., operating costs, will be obtained by the use of the process wherein the mixture is utilized. Additional savings from new plant investment reduction and debottlenecking of existing plants may also be obtained by the use of the mixture of the invention. The removal of acid gases such as $CO_2$ from gas mixtures is of major industrial importance, particularly the systems which utilize potassium carbonate activated by the unique activator or promoter system of the present invention.

While the sterically hindered amines, as shown in U.S. Pat. No. 3,112,050, provide unique benefits in their ability to improve the working capacity in the acid scrubbing process, their efficiency may decrease in alkaline "hot pot" (hot potassium carbonate) scrubbing systems at high temperatures and at low concentrations of the acid gas due to phase separation. Therefore, full advantage of the highly effective sterically hindered amines cannot always be utilized at these operating conditions. The addition of an amino acid, as a cosolvent, as shown in U.S. Pat. No. 4,094,957, solves the problem of phase separation and enables a more complete utilization of sterically hindered amines as the alkaline materials activator or promoter. This result was unexpected for the reason that many sterically hindered amino acids (including the sterically hindered amino acid, pipecolinic acid) alone, while soluble in these alkaline systems, are not as effective as activators in acid gas scrubbing processes as the other sterically hindered amino compounds. The specific admixture, as instantly claimed and disclosed, while not employing a sterically hindered diamino compound, provides the same working capacity and/or rates of $CO_2$ adsorption as those previously reported in U.S. Pat. No. 4,094,957, particularly the N-cyclohexyl 1,3-propanediamine and pipecolinic acid promoter system.

The absorbing solution of the present invention, as described above, will be comprised of a major proportion of the alkaline materials, e.g., alkali metal salts or hydroxides and a minor proportion of the amine activator system. The remainder of the solution will be comprised of water and/or other commonly used additives, such as anti-foaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

Representative non-sterically hindered diamino compounds for use in the present invention include N,N-diethyl-1,3-propanediamine, N-methyl-N-butyl-1,3-propanediamine, N,N-dibutyl-1,3-propanediamine, N-methyl-N-cyclohexyl-1,3-propanediamine, N-methyl-N-cyclohexyl ethylenediamine, N-3-aminopropyl-2-pipecoline, N-(2-aminoethyl)-hexamethyleneimine, N-(3-aminopropyl)-hexamethyleneimine, and the like.

Representative amino acids applicable herein include: N,N-diethyl glycine, N,N-dimethyl glycine, pipecolinic acid, N-secondary butyl glycine, N-2-amyl glycine, N-isopropyl glycine, N-isopropyl alanine, N-secondary butyl-alpha-alanine, 2-amino-2-methyl butyric acid, and 2-amino-2-methyl valeric acid. Particularly preferred for use herein are pipecolinic acid and N-secondary butyl glycine.

The invention is illustrated further by the following examples which, however, are not to be taken as limiting in any respect. All parts and percentages, unless expressly stated to be otherwise, are by weight.

EXAMPLE 1

The reaction apparatus consists of an absorber and desorber as shown in FIG. 1 of U.S. Pat. No. 4,112,050, incorporated herein by reference. The absorber is a vessel having a capacity of 2.5 liters and a diameter of 10 cm, equipped with a heating jacket and a stirrer. A pump removes liquid from the bottom of the reactor and feeds it back to above the liquid level through a stainless-steel sparger. Nitrogen and $CO_2$ can be fed to the bottom of the cell through a sparger.

The desorber is a 1-liter reactor, equipped with teflon blade stirrer, gas sparger, reflux condenser and thermometer.

The following reagents were put into a 2-liter Erlenmeyer flask:
  55 g of N-(3-aminopropyl)-2-pipecoline
  22.5 g of pipecolinic acid
  225 g of $K_2CO_3$
  447.5 g of water When all solids had dissolved, the mixture was put into the absorber and brought to 80° C., the stirrer being regulated at 1,200 rpm. The apparatus was closed and evacuated until the liquid began to boil. The pump for the liquid was regulated so as to circulate about four liters of liquid per minute. At this near-boiling point, $CO_2$ gas was admitted into the absorber. In total, 38.7 liters of $CO_2$ were absorbed, correcting for the amount used to fill the vapor space.

The rich solution was transferred to the desorber and boiled at 105° C. for one hour in a nitrogen flow, during which time 30 liters of $CO_2$ were desorbed. Only one liquid phase was present.

The regenerated solution so obtained was transferred back to the absorber and cooled to 80° C. The apparatus was closed and evacuated until the liquid began to boil. At this point $CO_2$ was admitted. A total of 31.5 liters of $CO_2$ was reabsorbed in 9 minutes, of which 11 liters were absorbed in the first minute. Corrected for the amount of $CO_2$ used to fill the vapor space, the volume of $CO_2$ reabsorbed was 29.5 liters.

When the experiment was repeated, replacing the N-(3-aminopropyl)-2-pipecoline and pipecolinic acid with 37.5 g of diethanolamine, only 22 liters of $CO_2$ were reabsorbed, and corrected for the $CO_2$ volume used to fill the vapor space, 20 liters were reabsorbed, of which only 4 liters were absorbed in the first minute.

EXAMPLE 2

The reaction apparatus used in this example is a 1-liter autoclave, equipped with Herculite (trademark) windows to enable observation of the contents.

A solution of the following ingredients was prepared in an Erlenmeyer flask:
  44.5 g of N-(3-aminopropyl)-2-pipecoline
  18.2 g of pipecolinic acid
  180 g of $K_2CO_3$
  357.3 g of water A sufficient amount of solid $CO_2$ was then added to the solution to bring the mixture to one phase. The solution was then charged into the autoclave and heated to 121° C. A mixture containing 0.2% $CO_2$ and 99.8% helium gas was slowly blown through the solution at a pressure of 50 psig. The operation was continued until the outgoing gas had the same composition as the entering gas, i.e., 0.2% $CO_2$, as determined by gas chromatography, indicating that equilibrium was reached. Only one phase was present, and the $CO_2$ content was analyzed at 10.9%.

Pure $CO_2$ gas was then blown through the solution at a total pressure of 300 psig until the outgoing gas had the same composition as the entering gas. The solution was clear with no precipitate present, and the $CO_2$ content was 18.8%.

When the experiment was repeated, replacing the N-(3-aminopropyl)-2-pipecoline and the pipecolinic acid with 5% of diethanolamine, the $CO_2$ content of the liquid varied only from 10.5% to 16.8%. Thus, the diamine herein exhibits not only a rate effect but also an equilibrium effect.

EXAMPLE 3

The following reagents were put into a 2-liter Erlenmeyer flask:
  50 g of N-(2-aminoethyl)-hexamethyleneimine
  22.5 g of pipecolinic acid
  225 g of $K_2CO_3$
  452.5 g of $H_2O$ When all solids had dissolved, the mixture was put into the absorber and an absorption-desorption-reabsorption cycle was carried out as described in Example 1.
  37 liters of $CO_2$ were absorbed;
  26.4 liters of $CO_2$ were desorbed; and
  29.5 liters of $CO_2$ were reabsorbed, of which 8 liters were reabsorbed in the first minute.

EXAMPLE 4

The following reagents were charged into a 2-liter Erlenmeyer flask:
  60g of N-methyl-N-cyclohexyl-1,3-propanediamine
  22.5 g of pipecolinic acid
  225 g of $K_2CO_3$
  442.5 g of $H_2O$ When all solids had dissolved, the mixture was put into the absorber and an absorption-desorption-reabsorption cycle was carried out as described in Example 1.
  36.2 liters of $CO_2$ were absorbed;
  27.5 liters of $CO_2$ were desorbed; and
  32.8 liters of $CO_2$ were reabsorbed, of which 10 liters were reabsorbed within the first minute.

EXAMPLE 5

The following reagents were charged into a 2-liter Erlenmeyer flask:
  55 g of N-methyl-N-cyclohexyl ethylenediamine
  22.5 g of pipecolinic acid
  225 g of $K_2CO_3$
  447.5 g of $H_2O$ When all solids had dissolved, the mixture was put into the absorber and an absorption-desorption-reabsorption cycle was carried out as described in Example 1.
  38 liters of $CO_2$ were absorbed;
  28.7 liters of $CO_2$ were desorbed; and
  32 liters of $CO_2$ were reabsorbed, of which 10 liters were absorbed in the first minute.

EXAMPLE 6

This example illustrates the stability of the activator system of this invention as compared with the stability of an activator system containing N-cyclohexyl propanediamine, the preferred sterically hindered diamine of U.S. Pat. No. 4,094,957.

A stock solution was prepared by mixing 7.40 g of N-(3-aminopropyl)-2-pipecoline, 6.0 g of pipecolinic acid, 2.04 g of potassium bisulfide and 53.2 g of deionized water. The resulting solution had a density of 1.034 g/ml. Twelve identical 10 cc stainless steel ampoules were each charged with 3 cc of the stock solution above described and 1.835 g of potassium bicarbonate. The ampoules were then flushed with nitrogen gas, sealed, and immersed in a constant temperature bath set at 160°±0.2° C., whereupon each ampoule was shaken vigorously for rapid and even temperature equilibration. At pre-set times the ampoules were withdrawn, quenched in cold water and opened. A 3 cc aliquot of isopropanol solution containing a known concentration of an internal standard was added to the opened ampoule together with 2 g of potassium carbonate. The resulting mixture was shaken and stirred to induce complete extraction of the diamine into the isopropanol phase. Gas chromatographic analysis of the isopropanol layer revealed that the rate of degradation of the N-(3-aminopropyl)-2-pipecoline was about 16 times slower than the rate of degradation of N-cyclohexyl propanediamine under the same conditions.

In summary, the present invention is seen to provide a class of non-sterically hindered diamino compounds which perform effectively in acid gas scrubbing processes and are relatively stable to the acid gases present in the system.

While the invention has been described in connection with specific embodiments thereof, it will be understood that it is capable of further modification and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of $CO_2$ from a gaseous stream containing $CO_2$ which comprises (1) in an absorption step, absorbing $CO_2$ from said gaseous stream with an aqueous absorbing solution comprising (a) a basic alkali metal salt or hydroxide selected from the group consisting of alkali metal bicarbonates, carbonates, hydroxides, borates, phosphates and their mixtures, and (b) an activator or promoter system for said basic alkali metal salt or hydroxide comprising (i) at least one non-sterically hindered diamine which is defined as a compound containing both a primary and a tertiary amino moiety wherein the primary amino moiety is attached to a primary carbon atom, and (ii) an amino acid which has the capability to increase the solubility of said diamines in alkaline aqueous conditions at elevated temperatures, and (2) in a desorption and regeneration step desorbing at least a portion of the absorbed $CO_2$ from said absorbing solution.

2. The process of claim 1 wherein said amino acid has 4 to 8 carbon atoms and is free of any hydroxyl groups and is either a tertiary amino acid wherein the amino moiety is a tertiary amino moiety or a sterically hindered amino acid containing at least one secondary amino moiety attached to either a secondary or tertiary carbon atom or a primary amino moiety attached to a tertiary carbon atom.

3. The process of claim 1 wherein said amino acid is pipecolinic acid or N-secondary butyl glycine.

4. The process of claim 1 wherein said basic alkali metal salt or hydroxide is potassium carbonate.

5. The process of claim 1 wherein the aqueous solution contains 10 to about 40% by weight of said basic alkali metal salt or hydroxide.

6. The process of claim 1 wherein the aqueous solution contains 2 to about 20% by weight of said diamine and 2 to about 20% by weight of said amino acid.

7. The process of claim 1 wherein said diamine is represented by the following general formulae:

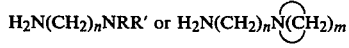

wherein R and R' independently represent a $C_1$-$C_6$ alkyl or a $C_6$-$C_8$ cycloalkyl group, n is an integer of at least 2, and m is an integer of at least 4.

8. The process of claim 1 wherein said diamine is N-(3-aminopropyl)-2-pipecoline, N-(2-aminoethyl)-hexamethyleneimine, N-methyl-N-cyclohexyl-1,3-propanediamine, or N-methyl-N-cyclohexyl ethylenediamine.

9. The process of claim 1 wherein the temperature of the absorbing solution during the absorption step is in the range of from about 25° to about 200° C., the pressure in the absorber ranges from about 5 to about 2,000 psia, and the partial pressure of the acid components in the feed stream ranges from about 0.1 to about 500 psia.

10. The process of claim 9 wherein the temperature of the absorbing solution during the regeneration step is in the range from about 25° to about 200° C. and at pressures ranging from about 16 to 100 psia.

11. The process of claim 1 wherein the absorbing solution additionally includes additives selected from the group consisting of antifoaming agents, antioxidants and corrosion inhibitors.

12. A process for the removal of $CO_2$ from a gaseous stream containing $CO_2$ which comprises, in sequential steps, (1) contacting the gaseous stream with an absorbing solution comprising (a) from about 20 to about 30 weight percent of potassium carbonate and (b) an activator or promoter system for the potassium carbonate comprising (i) from about 5 to about 15 weight percent of at least one non-sterically hindered diamine which is defined as a compound containing both a primary and a tertiary amino moiety wherein the primary amino moiety is attached to a primary carbon atom, and (ii) from about 5 to about 10 weight percent of pipecolinic acid or N-secondary butyl glycine, and (c) the balance of said absorbing solution being comprised of water and additives selected from the group consisting of antifoaming agents, antioxidants and corrosion inhibitors, wherein said contacting is conducted at conditions whereby $CO_2$ is absorbed in said absorbing solution and the temperature of the absorbing solution is in the range from about 35° to about 150° C., and the pressure in the absorber is in the range from about 100 to about 1,500 psia; and (2) regenerating said absorbing solution at conditions whereby $CO_2$ is desorbed from said absorbing solution, wherein the regeneration takes place at temperatures ranging from about 35° to about 105° C. and at pressures ranging from about 5 to about 100 psig.

13. The process of claim 12 wherein the absorbing solution from the regeneration step is recycled for reuse in the contacting step.

14. An aqueous acid gas scrubbing composition comprising: (a) 10 to about 40% by weight of an alkali metal salt or hydroxide, (b) 2 to about 20% by weight of a non-sterically hindered diamine containing both a primary and a tertiary amino moiety wherein the primary amino moiety is attached to a primary carbon atom, (c) 2 to about 20% by weight of an amino acid which has the capability to increase the solubility of said diamines in alkaline aqueous conditions at elevated temperatures, and (d) the balance, water.

15. An aqueous acid gas scrubbing composition comprising: (a) 20 to 30% by weight of potassium carbonate, (b) 5 to about 15% by weight of N-(3-aminopropyl)-2-pipecoline, (c) 5 to about 10% by weight of pipecolinic acid, and (d) the balance, water.

* * * * *